April 9, 1963   C. J. PERILLOUX   3,084,554
METHOD AND APPARATUS FOR TAKING FLUID SAMPLES FROM A FLOWING LINE
Filed Aug. 15, 1958
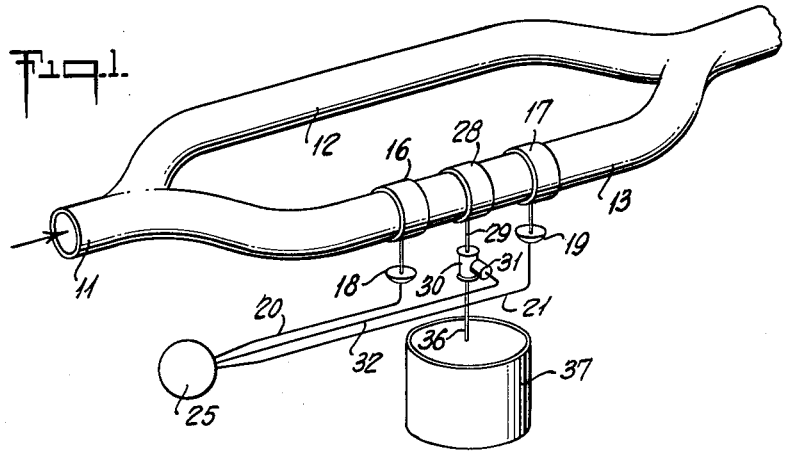
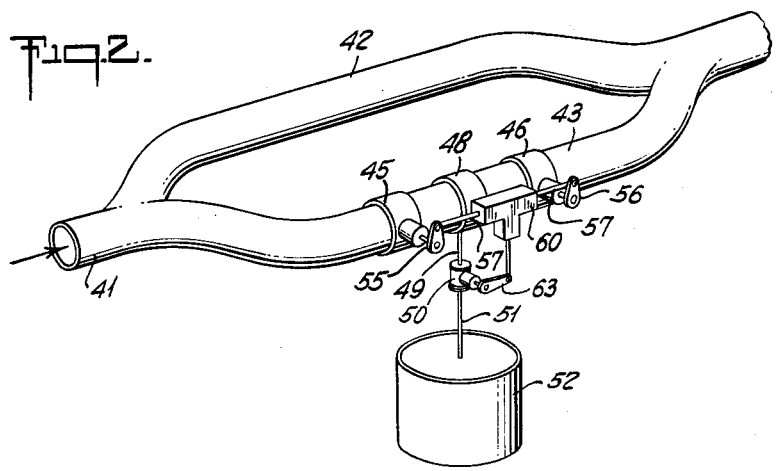
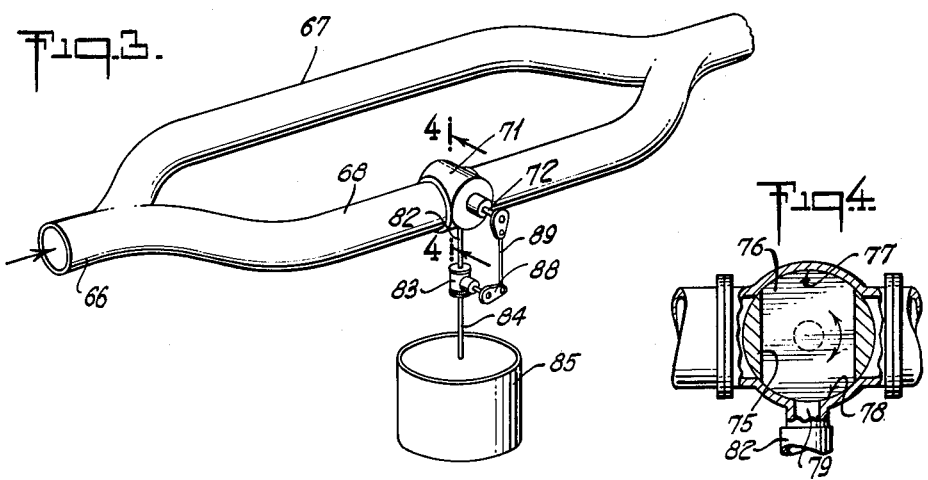

United States Patent Office 3,084,554
Patented Apr. 9, 1963

3,084,554
METHOD AND APPARATUS FOR TAKING FLUID SAMPLES FROM A FLOWING LINE
Charles J. Perilloux, Houston, Tex., assignor to Texaco Inc., a corporation of Delaware
Filed Aug. 15, 1958, Ser. No. 755,341
6 Claims. (Cl. 73—422)

This invention is concerned with a fluid sampling system, and method. More specifically the invention is concerned with the sampling of a fluid, such as crude oil, which is in fact a mixture of different density constituent parts in addition to some suspended solid matter.

Heretofore, there have been two principal methods employed in the sampling of crude oil. Sampling of crude oil is carried out in order to determine the qualities thereof prior to delivery to a pipe line, or otherwise for sale. One of these methods has been the selective withdrawal of a portion of fluid from some point in a pipe. Another has been the taking of a so-called "core sample" of the fluid as it stands in a container. Each of these methods have drawbacks and difficulties; among which is the fact that in the first named method, the withdrawing of the sample is dependent upon the location of the withdrawal point in determining whether the sample is truly representative of the oil being sampled. The second method of taking a sample from a container is subject to error if the container, or the parts involved in the core sampling thereof, should become clogged with sand, paraffin or other foreign matter that is usually found in the oil samples.

Consequently it is an object of this invention to provide a method and system for overcoming the above indicated disadvantages of the prior art arrangements.

Another object of the invention is to provide a system for incorporation into a crude oil pipe line, such that the oil may be sampled in a truly representative manner, while employing relatively inexpensive and simple apparatus.

Another object of the invention is to teach a method of taking samples of crude oil in a flowing pipe line, such that the samples are truly representative of the fluid in the line.

Still another object of the invention is to provide a loop, or branch line structure for a pipe line that carries crude oil therein, having both of the branches of such structure located horizontally in order that the conditions of the fluid flowing through both branches shall be substantially identical and truly representative. In addition to such structural arrangement of two branches, there is provided an arrangement for taking a representative quantity of the fluid as it flows through one of the branches and in this manner obtaining a truly representative sample of the fluid.

Briefly, the invention concerns a method of taking samples from a flowing pipe line which carries a mixed fluid having different density constituent parts, in addition to some suspended solid matter. The method comprises the steps of dividing said pipe line into at least two streams, and maintaining said streams on the same level. The method also comprises the steps of isolating a section of one of said streams, and draining said isolated section for testing as a representative sample of the fluid in said pipe line.

Again briefly, the invention is concerned with a liquid carrying pipe line wherein flows a mixed fluid having different density constituent parts, including some suspended solid matter. In such a pipe line, the invention concerns a combination which comprises branch line means for dividing the flow of said liquid into a plurality of parallel paths. The said branch line means, maintains the fluid flowing in all of said paths substantially at the same level. The system also includes valve means in one of said parallel paths for simultaneously cutting off the flow of liquid at spaced points along the path, whereby a representative sample of said liquid is isolated therebetween. And the system also comprises means for draining said isolated sample for testing thereof.

Some specific examples of the invention are described below in more detail, and are illustrated in the drawings, in which:

FIG. 1 is a schematic showing in perspective, illustrating one embodiment of the invention;

FIG. 2 is a schematic perspective showing of another embodiment of the invention;

FIG. 3 is still another schematic perspective showing of a third embodiment of the invention; and FIG. 4 is a detail view, somewhat enlarged, taken in cross-section along the lines 4—4 of FIG. 3.

In delivering crude oil via a flow line, or pipe line, it is particularly important to be sure that the quality of the oil does not go below predetermined standards. Furthermore, even though the quality of the oil is acceptable, it is often important to know what certain of the properties of the oil are, as to any given batch thereof that is being delivered. Crude oil is made up of quite a number of different elements or constituents, and among these there are included various constituent parts of the total crude oil which may have different densities, and which often include in addition to liquids (e.g. some water) other types of foreign matter such as some suspended solid matter, e.g. sand or the like.

Since the various constituent parts of crude oil take such widely varying forms, it is no simple matter to take a truly representative sample of the crude oil. This is particularly true when it is flowing in a pipe line, or delivery line. It is necessary that such a sample be truly representative of the batch of crude oil that is being delivered; the sample including the constituent parts thereof, such as water, sand or other foreign matter in addition to the particular type of oil itself.

Referring to FIG. 1 it is pointed out that there is illustrated a pipe line, or flow line 11, which is carrying crude oil, or some other fluid of similar nature that is to be sampled. By means of any convenient type of structure, the flow line 11 is divided into two equal capacity branch lines 12 and 13. It is important to note that both of the branch lines 12 and 13 lie substantially horizontal, and at the same level as the flow line 11, and each other. This arrangement insures that the fluid flowing through each of the branch lines 12 and 13 is substantially the same in its distribution of the constituent elements in the fluid, as the fluid in the main line 11.

In the branch line 13 there is located a pair of diaphragm actuated valves 16 and 17. These valves are entirely schematically illustrated, as are a pair of diaphragm actuators 18 and 19 respectively, likewise. Connected to each of the diaphragm actuators 18 and 19 there is a fluid line 20 and 21 respectively. These fluid lines 20 and 21 lead to a fluid control system 25. The control system 25 is schematically illustrated as a circle, and contains all the necessary elements (not shown) to provide for the action that will be described below.

Located between the valves 16 and 17, in the branch line 13, there is a fluid drain connection 28 that has a drain pipe 29 extending therefrom for drawing off the fluid that is isolated between the valves 16 and 17 when they have been closed. In order not to draw off any fluids when the valves 16 and 17 are open, there is a valve 30 that is connected to the drain pipe 29. Valve 30 has a fluid type actuator 31 that is connected to the fluid control system 25 by means of a fluid line 32. Connected to the other side of the valve 30 there is a continuation drain pipe 36 that leads from the valve 30 to a tank 37 for collecting the sample or samples as they are drawn off.

Operation of the FIG. 1 system is as follows. Because it is desired to take representative samples of the crude oil or the like that is flowing in flow line 11, the branch line structure includes the branches 12 and 13 having equal sized inside diameters and lying horizontally throughout their length, as is the flow line 11. Furthermore both branches 12 and 13 should lie at the same level with one another and with flow line 11. By taking steps to insure these foregoing conditions, the fluid flowing in either of the branch lines will be substantially identical in all of its properties. At a predetermined desired time, the fluid control system 25 will provide fluid pressure signals such that the diaphragm actuators 18 and 19 will be simultaneously actuated so as to close the valves 16 and 17, also simultaneously. This will isolate a short length of the fluid located in branch line 13 from the rest of the fluid of the flow line 11. Now, as soon as the valves 16 and 17 have been completely closed, the valve 30 may be opened by means of its actuator 31; and that fluid in branch 13 of the flow line, that is located between the valves 16 and 17, will flow through the drain pipes 29 and 36 via the valve 30, into a tank 37 where the sample thus taken will be gathered. As soon as the sample has drained out from the branch 13 into the tank 37, valve 30 will be again closed. Thereafter valves 16 and 17 will be opened once more, to allow passage of the fluid through the branch line 13 again.

It will be noted that the foregoing procedure for taking a single sample may be repeated at periodic intervals as often as desired. Thus a clockwork mechanism (not shown) for periodic draining of samples from the branch line 13 may be provided and set for sampling as often as is desired, during any given batch of crude oil delivery through the pipe line 11, or for some other period of time if desired. The samples as thus taken from the pipe line 11 may be tested at leisure, or as often as desired, by taking the fluid that has gathered in the tank 37 and making the required tests thereof to determine the quality or any properties thereof.

It is pointed out that the samples taken will be truly representative of the fluid flowing in the flow line 11 for the reason, among others, that the flow of fluid in the flow line 11 is not substantially disturbed during the taking of a sample, since the branch line 12 is open at all times to allow flow of the fluid therethrough.

Referring to FIG. 2 it is pointed out that there is illustrated a pipe line, or flow line 41, that is similarly provided with two equal capacity branch lines 42 and 43. In the branch 43, there is located a pair of schematically illustrated plug type valves 45 and 46. As before there is a drain connection 48 that is located between the valves 45 and 46. A drain pipe 49 extends from the drain connection 48 to a valve 50 that has another drain pipe 51 connected thereto and which leads to a sample-collecting tank 52.

It is pointed out that plug valves are ordinarily operated with the axis of the plug of such a valve standing vertically. The valves 45 and 46 are indicated in horizontal positions, merely for convenience in the illustrative drawing.

There is a mechanical valve operator 55, on the plug valve 45; and similarly there is another mechanical valve operator 56 on the plug valve 46. These are connected by any convenient mechanical system, e.g. by a linkage including shafts 57 shown, to a control element 60 that is schematically illustrated as a T-shaped box.

The internal arrangement (not shown) of the control element 60 is such that the plug valves 45 and 46 are actuated simultaneously, from open to closed positions. In addition, there is a mechanical valve operator 63 on the drain valve 50. Operator 63 is also connected to the control element 60, but in such a manner that the valve 50 will be opened only after the plug valves 45 and 46 have been closed.

The operation of the system of FIG. 2 is substantially the same as that of the FIG. 1 system, and consequently need not be described again. It will be noted that the only differences between the two systems shown in FIGS. 1 and 2 lie in a specific type of valve and valve control systems employed.

Referring to FIG. 3 it is pointed out that there is shown another embodiment according to the invention. In this case the valve structure employed is somewhat different. There is a pipe line or flow line 66 which has two equal sized branches 67 and 68 that lie horizontally and at the same level. In the branch line 68, there is located a specially constructed plug valve 71 which has an operating shaft 72 for changing the valve from open to closed positions. Referring to FIG. 4 it is pointed out at the internal structure of the valve 71 includes a full opening type of structure, such that a plug 75 has a cavity 76 therethrough which is enlarged beyond the front and back sides (as viewed in FIG. 4) of ports or openings 77 and 78, of the plug 75. This enlargement of the cavity 76, extends toward and away from the observer when viewing the structure as illustrated in FIG. 4, and is in effect a hollowing out of the plug 75 more than would be the case with a circular bore straight through. It is thus enlarged in order to provide for additional space within which to gather the sample of pipe line fluid.

It is pointed out that in FIG. 4 there is shown the plug 75 as it is situated when the valve 71 is in the closed position. Thus the plug isolates a section of fluid that was part of the branch line 68, and that is located between the inlet and outlet points of the valve 71, i.e. at the upstream and down stream ports thereof. In addition it will be noted that there is an outlet, or drain passage 79 that is connected to the internal cavity 76 when the plug 75 is in the valve closing position.

Referring to FIG. 3 again, it is pointed out that there is a drain pipe 82 that is connected to the interior of the valve 71, and that leads to a valve 83 which has another drain pipe 84 connected to the outlet side thereof. Pipe 84 leads to a tank 85. Drain valve 83 has a mechanical actuator 88 thereon; and there is a simple mechanical linkage between the shaft 72 of the plug valve 71, and the actuator 88 of the drain valve 83. Such linkage is indicated in a schematic manner by a shaft 89. This mechanical arrangement is made such that the closing of valve 71 will open the drain valve 83, after the valve 71 has completely closed to isolate fluid that is located within the cavity 76.

It is pointed out that in FIGS. 3 and 4, the structure shown is purely schematic in nature, as was the case with the other two embodiments of the invention. Consequently any feasible structure which can accomplish the desired results may be employed.

It is to be noted that even though the illustrated structure of plug 75 and drain passage 79, of the valve 71, in conjunction with the cavity 76, is such that when the valve plug 75 is partially turned towards open position there is a fluid passage open from drain 79 to one side or the other of the branch line 68; the flow of fluid out through drain pipe 82 will not take place. This is so because during this time the drain valve 83 will be maintained in a closed position, so that no flow of the fluid from the branch line 68 out through the drain passage 79 can occur.

The operation of the FIGS. 3 and 4 system is substantially the same as that for the other two modifications, and consequently no repetitious description of the operation need be provided. It is sufficient to point out that in the FIG. 3 system the structure is such that even though a smaller volume sample will be taken only a single valve need be operated to cause the desired isolation of a sample of the fluid flowing in the branch line. Thus, in this embodiment the fluid flow in the stream of branch line 68 is closed off at two points therealong, which are the inlet and outlet ports of the valve 71. These ports are closed when the plug 75 is turned to the closed position, i.e. that illustrated in FIG. 4.

It will be appreciated that the FIG. 3 and FIG. 4 showings are schematic in nature, as were the earlier embodiments, and many other and different structures from those suggested may be employed without departing from the spirit of the invention.

While certain embodiments of the invention have been described in considerable detail above in acordance with the applicable statutes, this is not to be taken as in any way limiting the invention, but merely as being descriptive thereof.

What is claimed as the invention is:

1. In a liquid carrying pipe line wherein flows a mixed fluid having different density constituent parts including some suspended solid matter, the combination comprising a horizontally disposed flow line for carrying said mixed fluid, substantially horizontal branch line means connected to said flow line for dividing the flow of said liquid into a plurality of parallel paths, said branch line means maintaining the fluid flowing in all of said paths substantially at the same level, said branch line paths having equal sized inside diameters, valve means in one of said parallel paths, means for closing said valve means to isolate a sample of the liquid in said flow line, and means for draining said isolated sample for testing thereof.

2. In a liquid carrying pipe line wherein flows a mixed fluid having different density constituent parts including some suspended solid matter, the combination comprising a horizontally disposed flow line for carrying said mixed fluid, substantially horizontal branch line means connected to said flow line for dividing the flow of said liquid into a plurality of parallel paths, said branch line means maintaining the fluid flowing in all of said paths substantially at the same level, said branch line paths having equal sized inside diameters, a pair of diaphragm actuated valves located spaced apart in one of said parallel paths, fluid control means for simultaneously closing said valves to isolate a sample of the liquid in said pipe line, and means for draining said isolated sample for testing thereof.

3. In a liquid carrying pipe line wherein flows a mixed fluid having different density constituent parts including some suspended solid matter, the combination comprising a horizontally disposed flow line for carrying said mixed fluid, a pair of equal capacity branch lines for dividing the flow of said liquid equally into two parts, said branch lines having the full length of each lying substantially horizontal and at the same level as said flow line, said branch lines having equal sized inside diameters, valve means in one of said branch lines for simultaneously cutting off the flow of liquid at spaced points along one of said parts whereby a representative sample of said liquid is isolated therebetween, and means for draining said isolated sample for testing thereof.

4. In a liquid carrying pipe line according to claim 3, the combination wherein said valve means comprises a pair of valves and means for simultaneously closing same.

5. In a liquid carrying pipe line according to claim 3, the combination wherein said valve means comprises a pair of diaphragm actuated valves and means for simultaneously closing same.

6. In a liquid carrying pipe line according to claim 3, the combination wherein said valve means comprises a full opening plug valve having an enlarged cavity within the plug, said plug valve being located in one of said branch lines in order to isolate a sample within the cavity thereof.

References Cited in the file of this patent
UNITED STATES PATENTS

| | | |
|---|---|---|
| 1,562,121 | Newton | Nov. 17, 1925 |
| 1,837,858 | Grace | Dec. 22, 1931 |
| 2,534,489 | Webber | Dec. 19, 1950 |
| 2,656,725 | Kestner et al. | Oct. 27, 1953 |
| 2,784,594 | Struck | Mar. 12, 1957 |
| 2,856,150 | McDonald | Oct. 14, 1958 |